United States Patent
Kwon et al.

(10) Patent No.: US 8,254,867 B2
(45) Date of Patent: Aug. 28, 2012

(54) METHOD AND APPARATUS FOR GENERATING DATA FRAME

(75) Inventors: Chang-yeul Kwon, Yongin-si (KR); Il-ju Na, Yongin-si (KR); Suk-jin Yun, Seoul (KR); Kyung-ik Cho, Seoul (KR); Hye-yeon Na, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 964 days.

(21) Appl. No.: 12/266,888

(22) Filed: Nov. 7, 2008

(65) Prior Publication Data

US 2009/0122767 A1    May 14, 2009

Related U.S. Application Data

(60) Provisional application No. 60/986,706, filed on Nov. 9, 2007.

(30) Foreign Application Priority Data

Aug. 12, 2008  (KR) .................. 10-2008-0079028

(51) Int. Cl.
*H04B 1/28* (2006.01)
(52) U.S. Cl. ........................... 455/333; 370/464

(58) Field of Classification Search .............. None
See application file for complete search history.

(56) References Cited

U.S. PATENT DOCUMENTS

| 2007/0110324 A1 | 5/2007 | Kwon et al. | |
| 2008/0075052 A1 | 3/2008 | Yang et al. | |
| 2008/0098274 A1* | 4/2008 | Kwon et al. | 714/748 |
| 2008/0232366 A1* | 9/2008 | He | 370/389 |

FOREIGN PATENT DOCUMENTS

| KR | 10-2007-0051632 A | 5/2007 |
| KR | 10-2008-0027043 A | 3/2008 |

OTHER PUBLICATIONS

Korean Office Action issued in corresponding Korean Application No. 10-2008-0079028 on Jul. 22, 2011.

\* cited by examiner

*Primary Examiner* — Cassandra Cox
(74) *Attorney, Agent, or Firm* — Sughrue Mion, PLLC

(57) ABSTRACT

Provided are a method and apparatus for generating a data frame. The method includes generating subframes from at least one media access control (MAC) service data unit (MSDU); generating a retransmission policy field for recording a policy related to a retransmission request, against an error occurring while the subframes are being transmitted, with regard to each of the subframes; and generating the data frame by using the subframes and the retransmission policy field which is generated with regard to each of the subframes.

23 Claims, 4 Drawing Sheets

METHOD AND APPARATUS FOR GENERATING DATA FRAME

This application claims the benefit of U.S. Provisional Patent Application No. 60/986,706, filed on Nov. 9, 2007, in the U.S. Patent and Trademark Office, and the benefit of Korean Patent Application No. 10-2008-0079028, filed on Aug. 12, 2008, in the Korean Intellectual Property Office, the disclosures of which are incorporated herein in their entirety by reference.

The present invention relates to a method and apparatus for generating a data frame in a wireless network environment, including a Wireless Personal Area Network (WPAN) and other types of wireless networks.

WPAN provides wireless data communication in a personal operating space having a relatively short distance range, such as home or an office. In the WPAN such as a piconet having a range of approximately 10 m, devices communicate each other in a time division multiple access (TDMA) method and form an ad hoc network. A large capacity of data can be transmitted at a frequency band of 60 GHz in the WPAN, at high speed by using a millimeter wave having a short wavelength of 1-10 mm and strong directivity.

This technique can enable high definition or high quality multimedia (video/audio) contents to be transmitted without being compressed in the WPAN so as to overcome any problem associated with the transmission of compressed data (e.g., high cost, longer delay, codec support requirement and so forth) due to a certain limited bandwidth in the network.

In order to provide communication standards in the personal operating space, Institute of Electrical and Electronics Engineers (IEEE) 802.15 working group (WG) standards are made and, from among four task groups (TGs) included in the IEEE 802.15 WG standards, IEEE 802.15.3 standards have completely standardized a high rate (HR)-WPAN that is a standard for data transmission at high speed.

According to an aspect of the present invention, there is provided a method of generating a data frame, the method including generating subframes from at least one media access control (MAC) service data unit (MSDU); generating a retransmission policy field for recording a policy related to a retransmission request, against an error occurring while the subframes are being transmitted, with regard to each of the subframes; and generating the data frame by using the subframes and the retransmission policy field which is generated with regard to each of the subframes.

Each of the subframes may include at least one of first type bits and second type bits which are extracted from the MSDU, and the policy related to the retransmission request may include at least one of a policy not allowing the retransmission request for a subframe having the error, if an error occurs while the subframes are being transmitted; a policy allowing the retransmission request for the whole subframe having the error; a policy allowing the retransmission request for only the first type bits of the subframe having the error; and a policy allowing the retransmission request for only the second type bits of the subframe having the error.

Each of the subframes may further include at least one of a frame check sequence (FCS) field for detecting an error of the first type bits; and an FCS field for detecting an error of the second type bits.

The method may further include generate a subframe information field representing which types of bits each of the subframes is formed of, from among the first type bits and the second type bits, and the generating of the data frame may include generating the data frame by using the subframes, and the retransmission policy field and the subframe information field which are generated with regard to each of the subframes.

The method may further include generating a subheader including the retransmission policy field and the subframe information field, with regard to each of the subframes, and the generating of the data frame may include generating the data frame by using the subframes, and the subheader which is generated with regard to each of the subframes.

The subheader may further include at least one of a modulation and coding scheme (MCS) information field representing an MCS applied to each of the subframes; an FCS information field representing whether FCS fields for detecting an error of the subframes are comprised in each of the subframes; an MSDU identification (ID) field containing information for identifying an MSDU which is used to generate each of the subframes; a fragmentation information field representing whether the subframes are fragmented; and a subframe length field representing a length of each of the subframes.

The generating of the data frame may include generating the data frame by using the subframes, a physical (PHY) header, a MAC header, and the subheader which is generated with regard to each of the subframes.

Each of the PHY header, the MAC header, and the subheader which is generated with regard to each of the subframes may be generated by applying an MCS having a lower data rate than MCSs applied to the subframes.

The policy related to the retransmission request may be recorded on the retransmission policy field in a binary type.

According to another aspect of the present invention, there is provided an apparatus for generating a data frame, the apparatus including a subframe generation unit generating subframes from at least one media access control (MAC) service data unit (MSDU); a field generation unit generating a retransmission policy field for recording a policy related to a retransmission request, against an error occurring while the subframes are being transmitted, with regard to each of the subframes; and a data frame generation unit generating the data frame by using the subframes and the retransmission policy field which is generated with regard to each of the subframes.

The apparatus may further include a header generation unit generating a subheader comprising the retransmission policy field and the subframe information field, with regard to each of the subframes, and the data frame generation unit may generate the data frame by using the subframes, and the subheader which is generated with regard to each of the subframes.

According to another aspect of the present invention, there is provided a computer readable recording medium having recorded thereon a computer program for executing a method of generating a data frame, the method including generating subframes from at least one media access control (MAC) service data unit (MSDU); generating a retransmission policy field for recording a policy related to a retransmission request, against an error occurring while the subframes are being transmitted, with regard to each of the subframes; and generating the data frame by using the subframes and the retransmission policy field which is generated with regard to each of the subframes.

Figure 1:
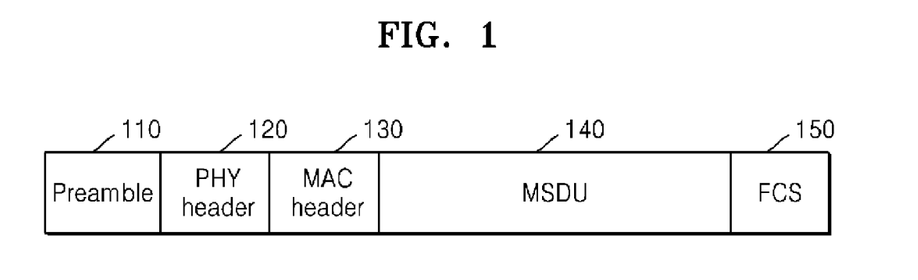
FIG. 1 is a structural diagram of a normal data frame used in a wireless personal area network (WPAN)

The above and other features and advantages of the present invention will become more apparent by describing in detail exemplary embodiments thereof with reference to the attached drawings in which:

FIG. 1 is a structural diagram of a normal data frame used in a WPAN.

Referring to FIG. 1, a preamble 110 can be a field on which patterns for packet detection, symbol synchronization, and frequency synchronization are recorded.

A physical (PHY) header 120 may be a field on which information on a length of a frame body and a data rate of the frame body is recorded and is used in a PHY layer. A media access control (MAC) header 130 can be used in an MAC layer.

A MAC service data unit (MSDU) 140 may constitute data that the MAC layer receives from an upper layer, and include a payload of a MAC protocol data unit (MPDU) to be transmitted to the PHY layer through a service of the MAC layer.

A frame check sequence (FCS) 150 can constitute a field on which a cyclic redundancy check (CRC) code is recorded so that, if the data frame has an error of transmission, a receiver can detect the error.

Configuration and generation of the data frame according to an exemplary embodiment of the present invention can be implemented in a variety of manners, including the other wireless or wired communications environment, without departing from the scope of the present invention.

Figure 2:
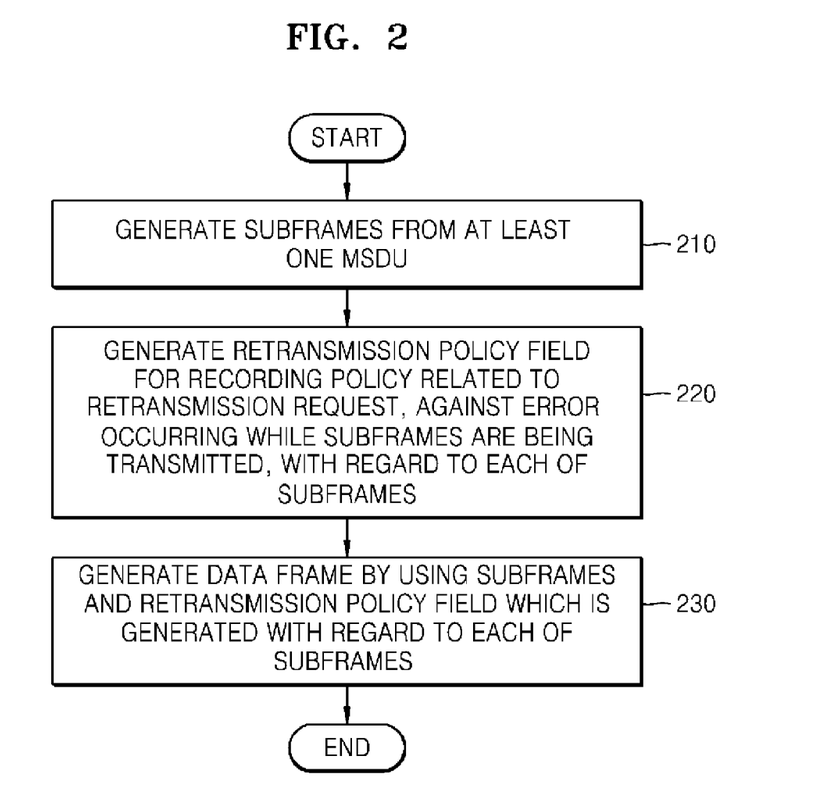
FIG. 2 is a flowchart of a method of generating a data frame, according to an embodiment of the present invention.

FIG. 2 is a flowchart of a method of generating a data frame, according to an exemplary embodiment of the present invention.

Referring to FIG. 2, in operation 210, subframes can be generated from at least one media access control (MAC) service data unit (MSDU).

Here, the MSDU may be formed of most significant bits (MSBs) and least significant bits (LSBs).

If the MSDU is data compressed by using a compressing algorithm such as a Moving Picture Experts Group (MPEG) algorithm or a Joint Photographic Experts Group (JPEG) algorithm, all bits would have the same significance. However, if the MSDU is non-compressed data such as RGB data, information contained in each bit has a different significance. For example, in normal RGB data, four upper bits of one byte can have more significant information than four lower bits. As such, in each byte of the MSDU, relatively more significant bits are referred to as the MSBs and relatively less significant bits are referred to as the LSBs. The number of MSBs in one byte may vary according to a data type or an embodiment of the present invention. However, in one byte, all bits which are not the MSBs can be the LSBs.

In this case, each of the subframes may include at least one of the MSBs and the LSBs which are extracted from the MSDU. In more detail, three types of subframes such as a subframe including an MSB(s) and an LSB(s), a subframe including only an MSB(s), and a subframe including only an LSB(s) may be generated.

According to another embodiment of the present invention, a frame check sequence (FCS) field for detecting an error of the MSBs and an FCS field for detecting an error of the LSBs may be included in each of the subframes.

For example, one or both of the FCS field for the MSBs and the FCS field for the LSBs may be included in each of the subframes.

In operation 220, a retransmission policy field including a policy related to a retransmission request, to be used when an error occurs while the subframes are being transmitted, with regard to each of the subframes, can be generated with regard to each of the subframes.

An error can occur when the subframes are transmitted to another device. A reception device receiving the subframes may request a transmission device to retransmit the subframe having the error occurred during the transmission.

This type of request can be referred to as the retransmission request and the policy related to the retransmission request may be a policy for determining whether to allow the retransmission request or whether to allow the retransmission request for only one of or both of the MSBs and the LSBs.

For example, when an error occurs while the subframes are being transmitted, if a value 00 is recorded on the retransmission policy field, the retransmission policy field may not allow the retransmission request for a subframe having the error, and, if a value 01 is recorded on the retransmission policy field, the retransmission policy field may allow the retransmission request for the whole subframe having the error.

Also, if a value 10 is recorded on the retransmission policy field, the retransmission policy field may allow the retransmission request for only MSBs included in the subframe having the error, and, if a value 11 is recorded on the retransmission policy field, the retransmission policy field may allow the retransmission request for only LSBs included in the subframe having the error.

Configuration and generation of the retransmission of the subframe according to an exemplary embodiment of the present invention can be implemented in a variety of manners without departing from the scope of the present invention.

In operation 230, the data frame can be generated by using the subframes and the retransmission policy field that is generated with respect to each of the subframes.

If an error occurs while the reception device is receiving the subframes of the data frame including the retransmission policy field according to the exemplary embodiment of the present invention, the reception device can request a transmitting device to retransmit a subframe with the error, according to the policy set by the retransmission policy field.

For example, if an error of transmission occurs to a subframe in which the value 10 is recorded on the retransmission policy field, although the error occurs to both of the MSBs and the LSBs of the subframe, the reception device may request the transmission device to retransmit only the MSBs of the subframe. Also, in this case, if the error occurs to only the LSBs of the subframe, the reception device may not request the transmission device to retransmit the MSBs or the LSBs of the subframe.

As described above, according to another embodiment of the present invention, a data frame may be transmitted by separately determining a policy related to a retransmission request for each subframe included in the data frame, and thus, if an error occurs to a subframe that does not need to be retransmitted, a retransmission request for that particular subframe may not be necessary.

Figure 3:
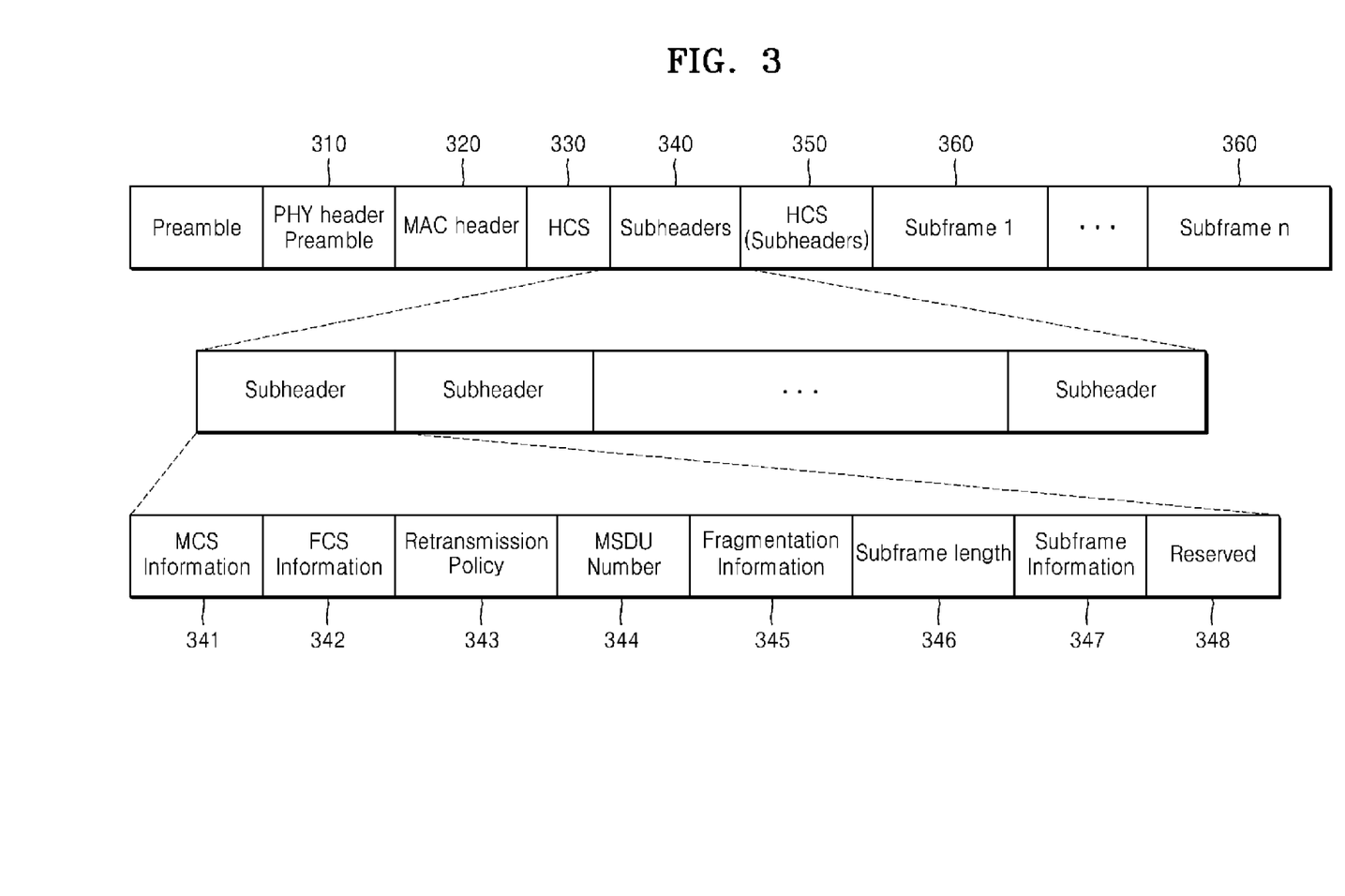
FIG. 3 is a structural diagram of a data frame according to an embodiment of the present invention.

FIG. 3 is a structural diagram of a data frame according to an embodiment of the present invention.

Referring to FIG. 3, the data frame according to an exemplary embodiment of the present invention includes a physical (PHY) header Preamble 310, a MAC header 320, a header check sequence (HCS) field 330 for the PHY header 310 and the MAC header 320, subheaders 340, an HCS field 350 for the subheaders 340, and subframes 360.

The PHY header 310 is a field on which information on a length of a frame body and a data rate of the frame body can be recorded and be used in a PHY layer. The MAC header 320 can be used in an MAC layer.

The HCS field 330 is a field on which an HCS that can be a cyclic redundancy check (CRC) code, for detecting an error of the PHY header 310 and the MAC header 320, is recorded.

The subheaders 340 may contain information on each of sub-frames, and each subheader can include a modulation and coding scheme (MCS) information field 341, an FCS information field 342, a retransmission policy field 343, an MSDU number field 344, a fragmentation information field 345, a subframe length field 346, a subframe information field 347, and a reserved field 348. Configuration and generation of the data frame according to an exemplary embodiment of the present invention can be implemented in a variety of manners, including the other types of field, without departing from the scope of the present invention.

The MCS information field 341 may represent an MCS applied to each of the subframes 360.

The FCS information field 342 can represent whether FCS fields for detecting an error of the subframes 360 are included in each of the subframes 360. For example, if a value 1 is recorded on the FCS information field 342, an FCS field for MSBs of a subframe and an FCS field for LSBs of the subframe may be included in the subframe, and, if a value 0 is recorded on the FCS information field 342, an FCS field for MSBs of a subframe and an FCS field for LSBs of the subframe may not be included in the subframe.

A reception device receiving the data frame can determine whether an error of transmission occurs to a received subframe, based on the FCS fields included in the subframe.

The MSDU number field 344 may constitute a field on which a number of an MSDU that is used to generate each of the subframes 360 is recorded in order to identify which MSDU is used to generate each of the subframes 360. However, according to another embodiment of the present invention, an MSDU identification (ID) field may be included instead of the MSDU number field 344, and an identifier of the MSDU, instead of the number of the MSDU, may be recorded on the MSDU ID field.

The subframe information field 347 may represent how each of the subframes 360 is formed. For example, the subframe information field 347 may represent whether each of the subframes 360 is formed of MSBs and LSBs, only the MSBs, or only the LSBs.

The fragmentation information field 345 can represent whether the subframes 360 are fragmented.

The subframe length field 346 may represent a length of each of the subframes 360.

The reserved field 348 may be reserved for use in the future.

Meanwhile, according to another embodiment of the present invention, each of the PHY header 310, the MAC header 320, the HCS field 330, the subheaders 340, and the HCS field 350 may be generated by applying an MCS having a lower data rate than MCSs applied to the subframes 360.

As such, each of the PHY header 310, the MAC header 320, the HCS field 330, the subheaders 340, and the HCS field 350 can have a lower probability of having an error than the subframes 360.

Meanwhile, the reception device receiving the data frame generated as described above, may request a transmission device to retransmit a subframe having an error, by transmitting a reception acknowledgment frame to the transmission device.

Figure 4:
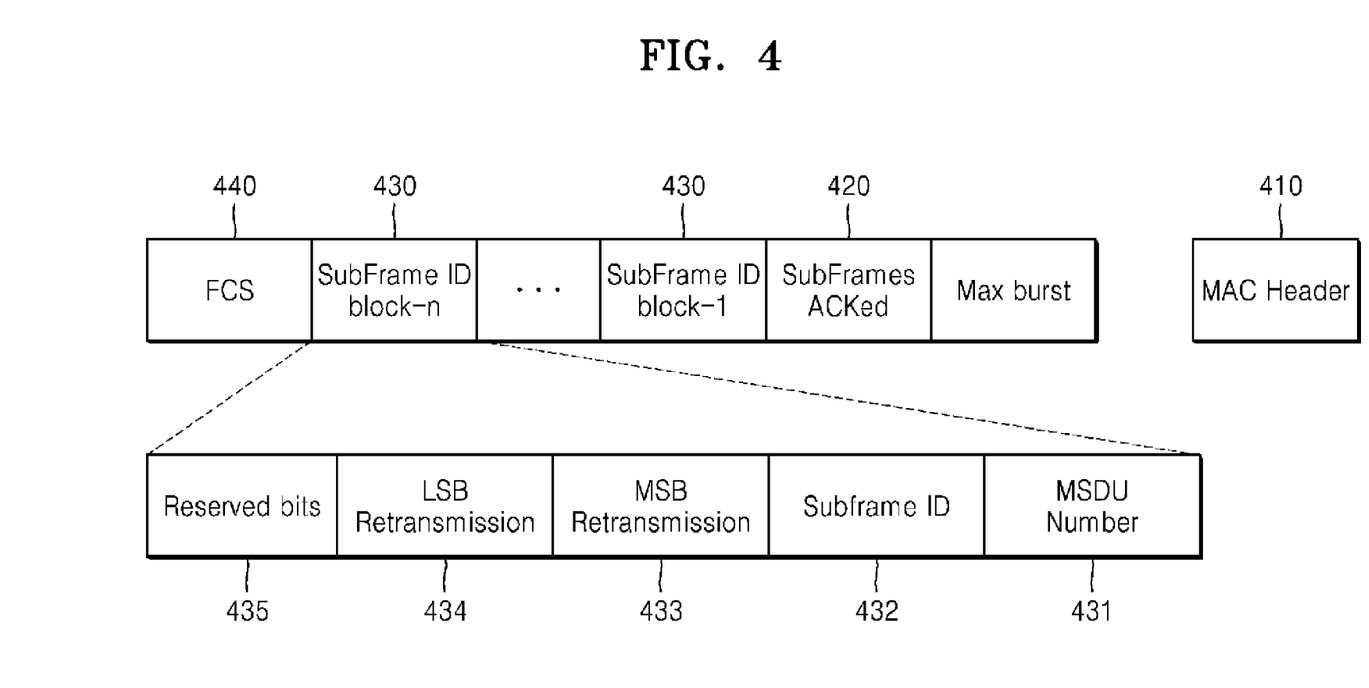
FIG. 4 is a structural diagram of a reception acknowledgment frame according to an embodiment of the present invention.

FIG. 4 is a structural diagram of a reception acknowledgment frame according to an exemplary embodiment of the present invention.

Referring to FIG. 4, the reception acknowledgment frame according to the current embodiment of the present invention may include an MAC header 410, a subframes ACKed field 420, a subframe ID block field 430, and an FCS field 440.

The MAC header 410 can be used in an MAC layer.

The subframes ACKed field 420 may represent the number of subframes which may be represented whether reception is acknowledged, through the reception acknowledgment frame in FIG. 4.

The subframe ID block field 430 can contain information related to received subframes, and include an MSDU number field 431, a subframe ID field 432, an MSB retransmission request field 433, an LSB retransmission request field 434, and a reserved field 435.

The MSDU number field 431 can be a field on which a number of an MSDU that is used to generate each of the received subframes is recorded.

The subframe ID field 432 may contain information for identifying the received subframes.

The MSB retransmission request field 433 may represent whether retransmission of MSBs of the received subframes is requested.

The LSB retransmission request field 434 can represent whether retransmission of LSBs of the received subframes is requested.

In this case, information indicating whether the retransmission is requested, is recorded on the MSB retransmission request field 433 and the LSB retransmission request field 434, based on a policy related to a retransmission request, which is included in each of the received subframes.

For example, if the policy related to the retransmission request allows the retransmission request for only MSBs of a subframe having an error, in order to request to retransmit the MSBs, a value 1 may be recorded on the MSB retransmission request field 433 and a value 0 may be recorded on the LSB retransmission request field 434.

The reserved field 435 can be reserved for use in the future.

Other fields of the reception acknowledgment frame illustrated in FIG. 4 are described in Institute of Electrical and Electronics Engineers (IEEE) 802.15.3C standard documents and thus descriptions thereof are omitted here.

The level of importance for each bit can be different with respect to the uncompressed data. That is, MSB can be more important than LSB. To a user, video and audio trouble caused by errors in MSB can be more severe than the one by errors in LSB. That is why more vigorous error correction methods (e.g., MSB only retransmission) may be required for any error occurred in MSB.

Figure 5:
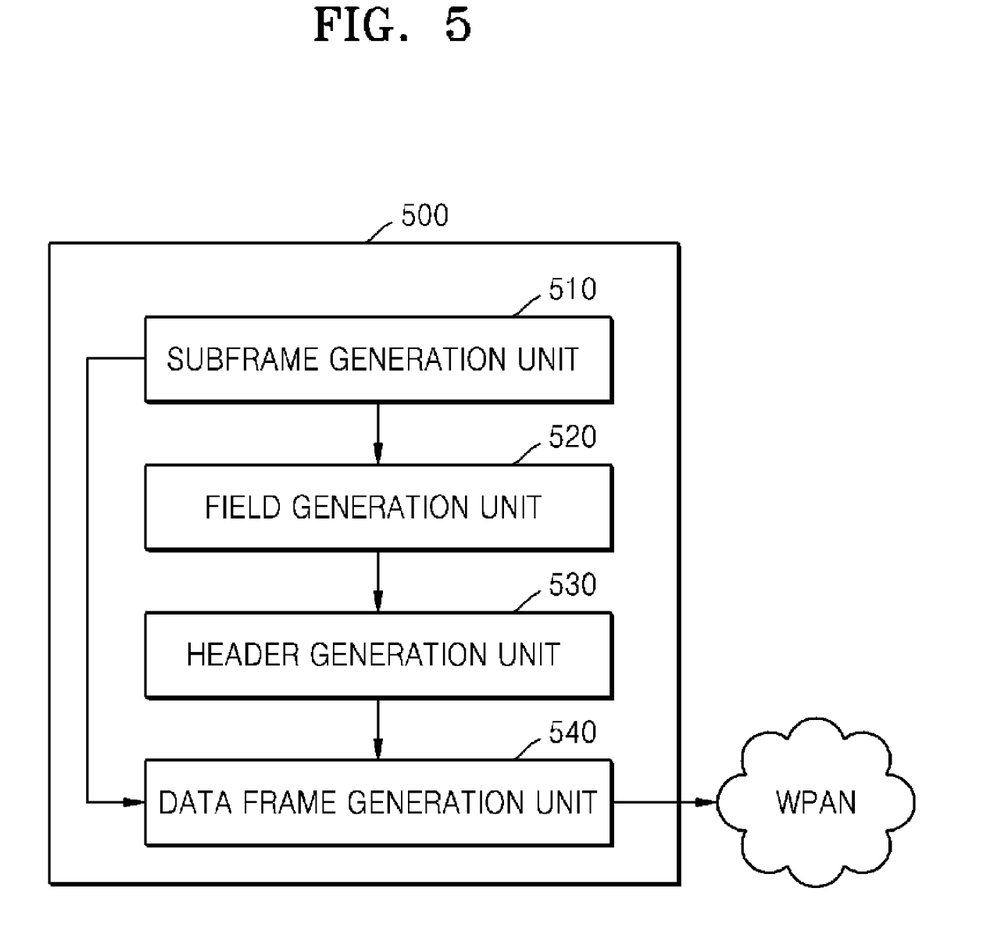
FIG. 5 is a block diagram of an apparatus for generating a data frame, according to an embodiment of the present invention.

FIG. 5 is a block diagram of an apparatus 500 for generating a data frame, according to an embodiment of the present invention.

Referring to FIG. 5, the apparatus 500 according to the current embodiment of the present invention can include a subframe generation unit 510, a field generation unit 520, a header generation unit 530, and a data frame generation unit 540.

The subframe generation unit 510 may generate subframes from at least one MSDU.

The field generation unit 520 can generate a retransmission policy field for recording a policy related to a retransmission request, against an error occurring while the subframes are being transmitted, with regard to each of the subframes. Also, the field generation unit 520 may generate a subframe information field representing which types of bits each of the subframes is formed of.

The header generation unit 530 can generate a PHY header, a MAC header, and a subheader including the retransmission policy field and the subframe information field.

The data frame generation unit 540 may generate the data frame by using the subframes, the PHY header, the MAC header, and the subheader that is generated with regard to each of the subframes.

Configuration of the apparatus for generating the data frame according to an exemplary embodiment of the present invention can be implemented in a variety of manners and comprise other units without departing from the scope of the present invention. For example, the apparatus for generating the data frame according to an exemplary embodiment of the present invention can comprise a bus coupling each unit of the apparatus, at least one processor couple to the bus, a memory coupled to the bus to store instructions and to the at least one processor to execute instructions of generating the data frame as described earlier.

The present invention can be compatible with technologies such as 802.11x and 802.15.3.

Meanwhile, embodiments of the present invention can be written as computer programs and can be implemented in general use digital computers that execute the programs using a computer readable recording medium.

Examples of the computer readable recording medium may include magnetic storage media (e.g., ROM, floppy disks, hard disks, etc.), optical recording media (e.g., CD-ROMs, or DVDs), and storage media. Carrier waves (e.g., transmission through the Internet) containing at least one of the embodiments of the present invention may be temporarily or permanently stored in the computer readable recording medium. Configuration or implementation of computer based instructions according to an embodiment of the present invention can be implemented in a variety of manners without departing from the scope of the present invention.

While the present invention has been particularly shown and described with reference to exemplary embodiments thereof using specific terms, the embodiments and terms have been used to explain the present invention and should not be construed as limiting the scope of the present invention defined by the claims. The preferred embodiments should be considered in a descriptive sense only and not for purposes of limitation. WPAN in accordance with an exemplary aspect of the present invention may be applicable to various applications as a wire or cable replacement technology for home entertainment systems capable of transmitting and receiving high definition video and audio files, it will be understood by one skilled in the art that various changes in form and details may be made therein without departing from the spirit and scope of the invention as defined by the appended claims. The preferred embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method comprising:
generating subframes from at least one media access control (MAC) service data unit (MSDU);
generating a retransmission policy field including a policy related to a retransmission request, to be used when an error occurs while the subframes are being transmitted, with regard to each of the subframes, wherein the policy related to the retransmission request comprises a policy for determining whether to allow the retransmission request or whether to allow the retransmission request for at least one of a first type of bits which are extracted from the MSDU, and a second type of bits which are extracted from the MSDU; and
generating a data frame by using the subframes and the retransmission policy field which is generated with respect to each subframe.

2. The method of claim 1, wherein each of the subframes comprises the at least one of the first type bits and the second type bits which are extracted from the MSDU, and
wherein the policy related to the retransmission request comprises at least one of:
a policy not allowing the retransmission request for a subframe having the error, if the error occurs while the subframes are being transmitted;
a policy allowing the retransmission request for the whole subframe having the error;
a policy allowing the retransmission request for only the first type bits of the subframe having the error; and
a policy allowing the retransmission request for only the second type bits of the subframe having the error.

3. The method of claim 2, wherein each of the subframes further comprises:
a frame check sequence (FCS) field for detecting an error of at least one of the first type bits and the second type bits.

4. The method of claim 2, further comprising:
generating a subframe information field representing which types of bits each of the subframes is formed of, from among the first type bits and the second type bits,
wherein the generating of the data frame comprises generating the data frame by using the subframes, and the retransmission policy field and the subframe information field which are generated with regard to each of the subframes.

5. The method of claim 4, further comprising:
generating a subheader comprising the retransmission policy field and the subframe information field, with respect to each of the subframes,
wherein the generating of the data frame comprises generating the data frame by using the subframes, and the subheader which is generated with regard to each of the subframes.

6. The method of claim 5, wherein the subheader further comprises at least one of:
a modulation and coding scheme (MCS) information field representing an MCS applied to each of the subframes;
an FCS information field representing whether FCS fields for detecting an error of the subframes are comprised in each of the subframes;
an MSDU identification (ID) field containing information for identifying an MSDU which is used to generate each of the subframes;
a fragmentation information field representing whether the subframes are fragmented; and
a subframe length field representing a length of each of the subframes.

7. The method of claim 5, wherein the generating of the data frame comprises generating the data frame by using the subframes, a physical (PHY) header, a MAC header, and the subheader which is generated with regard to each of the subframes.

8. The method of claim 7, wherein each of the PHY header, the MAC header, and the subheader which is generated with regard to each of the subframes is generated by applying an MCS having a lower data rate than MCSs applied to the subframes.

9. The method of claim 1, wherein the policy related to the retransmission request is recorded on the retransmission policy field in a binary type.

10. An apparatus for generating a data frame, the apparatus comprising:
a subframe generation unit generating subframes from at least one media access control (MAC) service data unit (MSDU);
a field generation unit generating a retransmission policy field for recording a policy related to a retransmission request, to be used when an error occurs while the subframes are being transmitted, with regard to each of the subframes; and
a data frame generation unit generating the data frame by using the subframes and the retransmission policy field which is generated with regard to each of the subframes,
wherein the policy related to the retransmission request comprises a policy for determining whether to allow the retransmission request or whether to allow the retransmission request for at least one of a first type of bits which are extracted from the MSDU, and a second type of bits which are extracted from the MSDU.

11. The apparatus of claim 10, wherein each of the subframes comprises the at least one of the first type bits and the second type bits which are extracted from the MSDU, and
wherein the policy related to the retransmission request comprises at least one of:
a policy not allowing the retransmission request for a subframe having the error, if the error occurs while the subframes are being transmitted;
a policy allowing the retransmission request for the whole subframe having the error;
a policy allowing the retransmission request for only the first type bits of the subframe having the error; and
a policy allowing the retransmission request for only the second type bits of the subframe having the error.

12. The apparatus of claim 11, wherein each of the subframes further comprises:
a frame check sequence (FCS) field for detecting an error of at least one of the first type bits and the second type bits.

13. The apparatus of claim 11, wherein the field generation unit generates a subframe information field representing which types of bits each of the subframes is formed of, from among the first type bits and the second type bits,
wherein the data frame generation unit generates the data frame by using the subframes, and the retransmission policy field and the subframe information field which are generated with regard to each of the subframes.

14. The apparatus of claim 13, further comprising:
a header generation unit generating a subheader comprising the retransmission policy field and the subframe information field, with regard to each of the subframes,
wherein the data frame generation unit generates the data frame by using the subframes, and the subheader which is generated with regard to each of the subframes.

15. The apparatus of claim 14, wherein the subheader further comprises at least one of:
a modulation and coding scheme (MCS) information field representing an MCS applied to each of the subframes;
an FCS information field representing whether FCS fields for detecting an error of the subframes are comprised in each of the subframes;
an MSDU identification (ID) field containing information for identifying an MSDU which is used to generate each of the subframes;
a fragmentation information field representing whether the subframes are fragmented; and
a subframe length field representing a length of each of the subframes.

16. The apparatus of claim 14, wherein the data frame generation unit generates the data frame by using the subframes, a physical (PHY) header, a MAC header, and the subheader which is generated with regard to each of the subframes.

17. The apparatus of claim 16, wherein each of the PHY header, the MAC header, and the subheader which is generated with regard to each of the subframes is generated by applying an MCS having a lower data rate than MCSs applied to the subframes.

18. The apparatus of claim 10, wherein the policy related to the retransmission request is recorded on the retransmission policy field in a binary type.

19. A computer readable medium comprising computer executable instructions, when executed, for directing a computing device to perform a method comprising:
generating subframes from at least one media access control (MAC) service data unit (MSDU);
generating a retransmission policy field including a policy related to a retransmission request, to be used when an error occurs while the subframes are being transmitted, with regard to each of the subframes; and
generating data frame by using the subframes and the retransmission policy field which is generated with respect to each subframe,
wherein the policy related to the retransmission request comprises a policy for determining whether to allow the retransmission request or whether to allow the retransmission request for at least one of a first type of bits which are extracted from the MSDU, and a second type of bits which are extracted from the MSDU.

20. A wireless device comprising:
a subframe generation unit;
a field generation unit;
a data frame generation unit;
a bus coupling each unit of the device;
at least one processor coupled to the bus; and
at least one memory coupled to the bus to store instructions and to the at least one processor to execute and perform a method comprising:
causing the subframe generation unit to generate subframes from at least one media access control (MAC) service data unit (MSDU);
causing the field generation unit to generate a retransmission policy field including a policy related to a retransmission request, to be used when an error occurs while the subframes are being transmitted, with regard to each of the subframes; and
generating data frame from the data frame generation unit by using the subframes and the retransmission policy field which is generated with respect to each subframe,
wherein the policy related to the retransmission request comprises a policy for determining whether to allow the retransmission request or whether to allow the retransmission request for at least one of a first type of bits which are extracted from the MSDU, and a second type of bits which are extracted from the MSDU.

21. The method of claim 1, wherein the first type of bits are most significant bits (MSBs) of the MSDU and the second type of bits are least significant bits (LSBs) of the MSDU.

22. The apparatus of claim 10, wherein the first type of bits are most significant bits (MSBs) of the MSDU and the second type of bits are least significant bits (LSBs) of the MSDU.

23. The wireless device of claim 20, wherein the first type of bits are most significant bits (MSBs) of the MSDU and the second type of bits are least significant bits (LSBs) of the MSDU.

* * * * *